H. Knight,
Tile Machine,
N°60,014.  Patented Nov. 27, 1866.
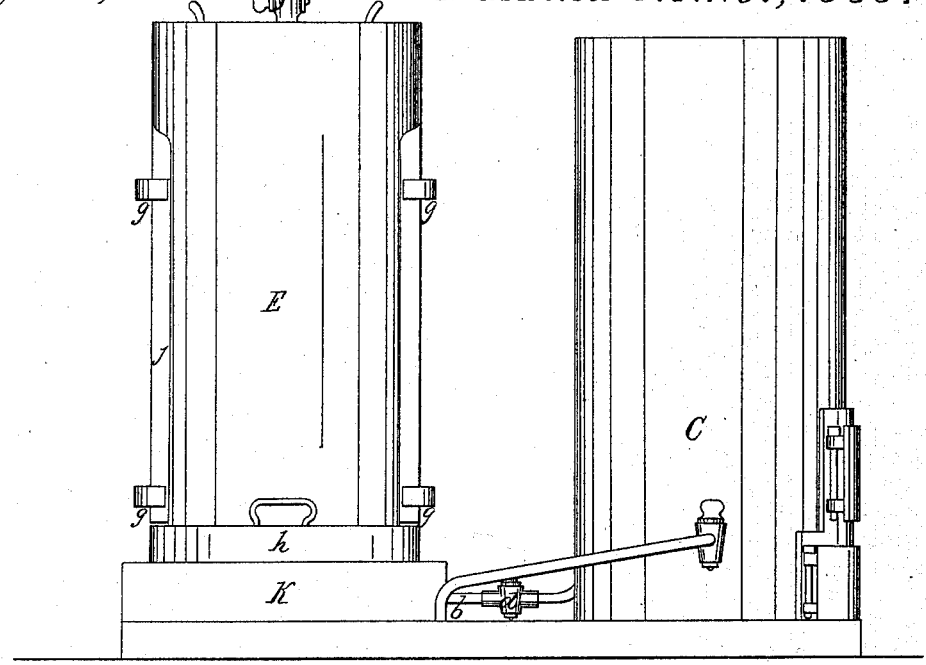
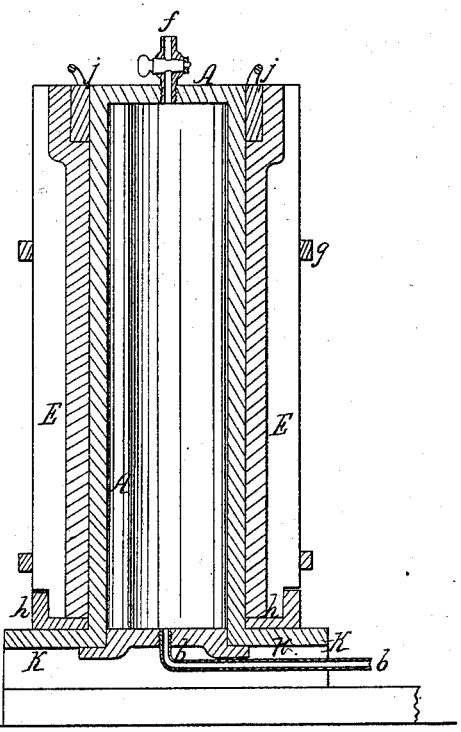
Witnesses.
Jos. L. Wightman
F. W. Webster
Inventor.
Henry Knight
by his attorney
C. S. Kenwick

United States Patent Office.

IMPROVEMENT IN CEMENT PIPES.

HENRY KNIGHT, OF BROOKLYN, NEW YORK.

Letters Patent No. 60,014, dated November 27, 1866.

SPECIFICATION.

TO ALL WHOM IT MAY CONCERN:

Be it known that I, HENRY KNIGHT, of Brooklyn, in Kings county, and the State of New York, have invented a new and useful improvement in moulds for moulding Cement Pipes and similar articles to which it is applicable, and that the following is a full, clear, and exact description of the same, reference being had to the accompanying drawing, in which—

Figure 1 is a side view of a pipe mould, constructed according to my invention, with a steam boiler connected therewith; and Figure 2 represents a view of the mould with half of the mould box removed, and the pipe and core in section.

The object of my invention is to hasten the setting of cement pipes after they are moulded, so as to permit them to be removed from the mould sooner than is customary. It is well known to makers of cement pipes that the cement sets slowly in cold weather, and in consequence of this peculiarity the pipe after moulding cannot be drawn from the mould as soon in cold weather as it can be in warm weather, thus requiring a larger number of moulds to be kept in use in cold weather to produce the same number of pipes than is requisite in hot weather. Moulds for cement pipes and other hollow cement articles consist necessarily of two principal parts—the shell or moulding box, which confines the cement and gives form to its exterior, (and which may consist of one or more members,) and the core which forms the internal cavity or bore, and gives it form. My invention consists in forming one or more parts of such a mould hollow, and combining such hollow mould with one or more pipes, by means of which a heated fluid may be introduced into one or more of its hollow parts, so that the mould is thereby heated, and the heat is imparted to the cement, which in consequence sets more rapidly than it otherwise would. The part of the mould which I prefer to make hollow and combine with pipes is the core, as that may remain stationary and the cement pipe may be drawn from it; but, if deemed expedient, the members of the shell or moulding box (which gives form to the exterior of the cement pipe) may be made hollow and be combined with pipes through which the heated fluid can be introduced. In the example of the application of my invention, represented in the drawing, the core, A, is hollow and is combined with a pipe, $b$, through which steam may be introduced from a small steam boiler, C. The steam pipe is fitted with a stop-cock, $d$, by means of which the supply of steam can be regulated or shut off, and the hollow core is provided with a snifting-cock, $f$, to permit the escape of air when the steam is first introduced. The core should also be provided with a drain-pipe to permit the escape of the water condensed from the steam, and this drain-pipe should communicate with a self-acting trap, such as is used to regulate the escape of condensed water from steam heaters. The hollow core is surrounded by the moulding box, E, which, in this example, is made in two parts that are secured to each other during moulding by clamps, $g\ g$, and rest upon a bottom plate, $h$. This plate is loose upon the core, and is provided with handles, by which the plate, the pipe, and the moulding box may be drawn from the core. The pipe is moulded in the usual manner, and if a socket is required at one of its ends, such socket may be made by means of the movable ring or socket mould, $j$. In the example represented, the core is fixed to a base, K, and is not moved relatively to the steam boiler during moulding or drawing; but, if found expedient, the core may be made movable relatively to the source of heat, and in such case it will be convenient to use a flexible pipe to conduct the heating fluid to the interior of the core. The pipe may also be made with a screw or other coupling by which the connection with the source of heat may be quickly made and severed. The core may be used in other positions than vertical, as for example in the horizontal position, and may be used to hasten the drying of cement pipes, either moulded in a removable moulding box or made in a jacket, which during moulding constitutes the shell or moulding box that gives form to the exterior of the cement, and subsequently is not withdrawn from the cement, but remains upon it, and constitutes a part of the finished pipe, which is then a compound of a cement interior and iron exterior. In place of combining the core part of the mould with the pipe or pipes for the introduction of the heating fluid, the moulding box part of the mould may be so combined with the pipe or pipes, or both the core and moulding box parts may be so combined with pipes. In place of using steam as the heating fluid, hot water may be used and may be made to circulate through the hollow part of the mould, entering by one pipe and passing out by another; or heated air may be used as the heating fluid, the air, hot from the heater or hot-air furnace, entering by one pipe and escaping by another. Steam, however, is, in my opinion, the most convenient heating fluid for practical use, and the apparatus hereinbefore described and represented in the drawing is a good one for using it. By its use the pipe may be removed from the core after only about one quarter of the time that is usually required to set the cement in cold weather has expired; consequently a great economy in time and in moulds is effected by the use of the invention.

What I claim as my invention, and desire to secure by Letters Patent, is—

The combination of a mould (composed of a shell and core) for making a cement article, with a pipe by which a heated fluid may be introduced into the hollow portion of such mould for the purpose of heating it, substantially as set forth.

In testimony whereof I have hereunto set my hand, this 26th day of September, 1866.

HENRY KNIGHT.

Witnesses:
CHARLES FOWLER,
HENRY CHASTY.